WOOD COMPONENT MEMBER CUTTING APPARATUS

Original Filed Oct. 9, 1961 6 Sheets-Sheet 1

INVENTOR.
GEORGE L. MAYO
BY Wm. T. Wofford
ATTORNEY

WOOD COMPONENT MEMBER CUTTING APPARATUS

Original Filed Oct. 9, 1961 6 Sheets-Sheet 2

INVENTOR.
GEORGE L. MAYO
BY
Wm. T. Hoffard
ATTORNEY

WOOD COMPONENT MEMBER CUTTING APPARATUS

Original Filed Oct. 9, 1961 6 Sheets-Sheet 3

INVENTOR.
GEORGE L. MAYO
BY Wm. T. Hoffard
ATTORNEY

WOOD COMPONENT MEMBER CUTTING APPARATUS

Original Filed Oct. 9, 1961 6 Sheets-Sheet 4

INVENTOR.
GEORGE L. MAYO
BY Wm. T. Wofford
ATTORNEY

WOOD COMPONENT MEMBER CUTTING APPARATUS

Original Filed Oct. 9, 1961 6 Sheets-Sheet 5

INVENTOR.
GEORGE L. MAYO
BY
Wm. T. Wofford
ATTORNEY

WOOD COMPONENT MEMBER CUTTING APPARATUS

Original Filed Oct. 9, 1961 6 Sheets-Sheet 6

INVENTOR.
GEORGE L. MAYO
BY Wm. T. Wofford
ATTORNEY

United States Patent Office

Re. 25,715
Reissued Jan. 26, 1965

25,715
WOOD COMPONENT MEMBER CUTTING APPARATUS

George L. Mayo, Fort Worth, Tex., assignor to Clary Corporation, Fort Worth, Tex.

Original No. 3,080,895, dated Mar. 12, 1963, Ser. No. 143,794, Oct. 9, 1961. Application for reissue July 9, 1964, Ser. No. 393,799
26 Claims. (Cl. 143—38)

Matter enclosed in heavy brackets [ ] appears in the original patent but forms no part of this reissue specification; matter printed in italics indicates the additions made by reissue.

This invention relates to wood component member cutting apparatus, and more particularly to apparatus for mass producing pre-cut wood members to be used in building construction.

Building construction costs are determined to a large extent by the labor involved. In recent years, the labor required for fabrication of wood portions of buildings at the building site has been greatly reduced by the provision of power saws. Even with such power saws, the workman in most cases still measures each piece of lumber individually and makes one cut at a time. In order to make further significant gains in labor savings, it is necessary that as much of the lumber as possible be pre-cut and fabricated before being moved to the building site. The most promising trend in this direction is that of providing pre-cut and pre-fabricated building components. This trend includes pre-fabricated building units, but it is even more significant in the building component area. Some typical building components that lend themselves to pre-cutting and prefabrication are roof trusses, wall sections, door openings, window openings, and floor sections. Some typical building members that may be pre-cut for use in fabrication of building components are roof truss members, rafters, studs, floor joists, and ceiling joists.

The trend toward pre-fabricated building components emphasizes the need for effective machinery which is capable of rapidly, accurately, and economically pre-cutting wood members of building components, and it is the general object of this invention to provide such machinery.

More particularly, it is an object of this invention to provide an improved machine which is capable of making one or more end angle cuts on both ends of wood members being conveyed through the machine.

Another object of this invention is to provide a machine which is capable of making angle end cuts on both ends of wood members being conveyed through the machine, and wherein the cutting angles may be readily changed without changing the length of the wood members.

Another object of this invention is to provide an improved machine which is especially effective for cutting roof truss members on a mass production basis.

Another object of this invention is to provide an improved roof truss member cutting machine wherein the machine can be quickly and easily adjusted for production of any one of many different roof truss members.

Another object of this invention is to provide an improved roof truss member cutting machine wherein saw angle adjustments can be made directly from indicia marked on the machine in truss terms.

Another object of this invention is to provide a roof truss member cutting machine embodying improved mechanism and mechanism arrangements.

These and other objects are effected by this invention as will be apparent from the following description taken in accordance with the accompanying drawings, forming a part of this application in which:

FIG. 11 (Sheet 1) is a schematic fragmentary view showing further details of the No. 2 saw angle positioning mechanism, and a typical brake mechanism;

FIG. 13 (Sheet 1) is a fragmentary schematic view showing details of a portion of the machine main frame side member and rack rail structure;

Figure 1:
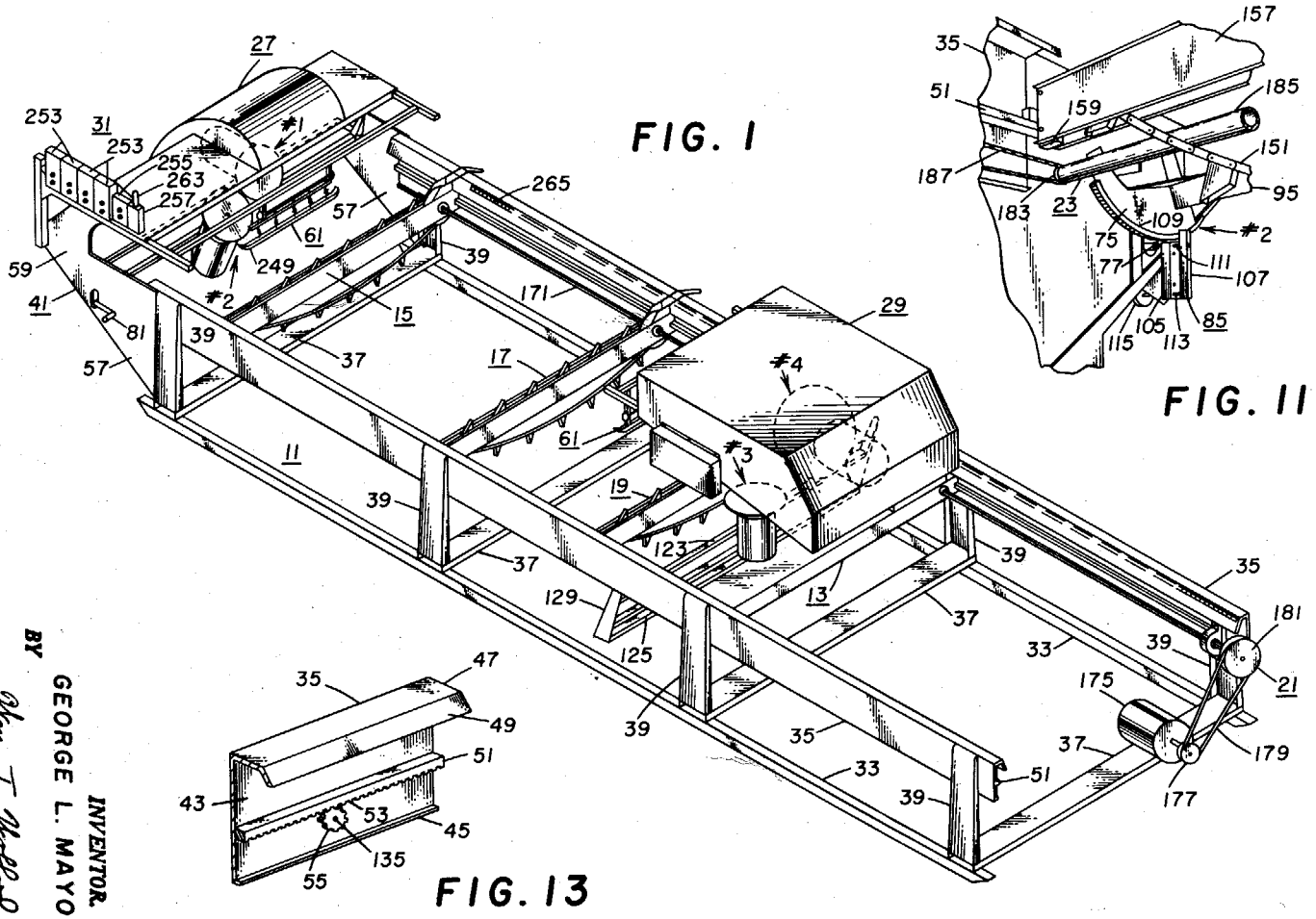
FIG. 1 is a schematic perspective view showing a wood component member cutting machine in accordance with a preferred embodiment of the invention, but with some portions simplified, and with the scrap ejectors omitted.
Figure 2:
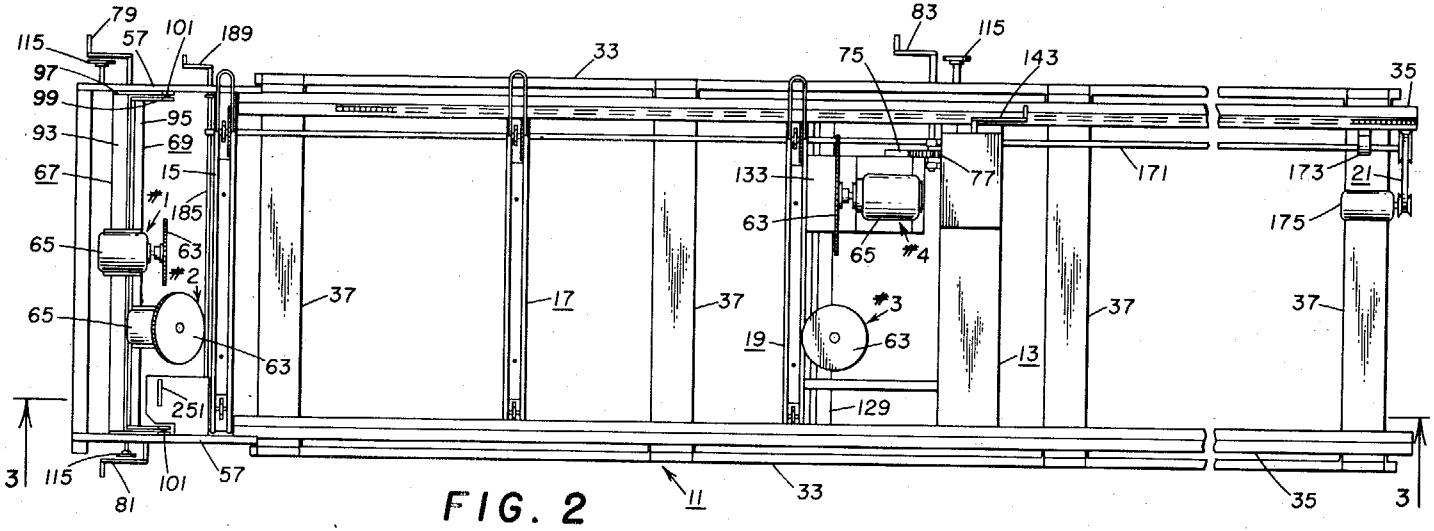
FIG. 2 is a schematic plan view of the machine of FIG. 1, but some parts omitted for clarity.
Figure 3:
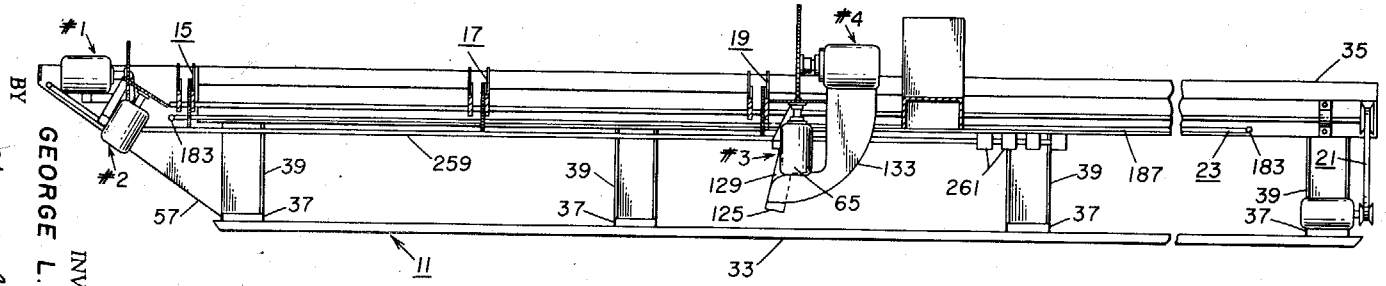
FIG. 3 is a section view taken at lines 3—3 of FIG. 2.

Referring now to the drawings, and particularly to FIGS. 1, 2 and 3, there is shown a wood component member cutting machine including a main frame structure 11, a No. 1 saw assembly, a No. 2 saw assembly, a No. 3 saw assembly, and a No. 4 saw assembly. For reference convenience herein the left end of the machine as viewed in FIG. 1 will be considered as the front, the right end as the rear, the near side as the left side, and the far side as the right side.

The No. 1 and No. 2 saw assemblies are located at the front end portion of the main frame 11 and are fixed so as to have no longitudinal movement relative to the main frame. The No. 1 saw is located on the right side portion while the No. 2 saw is located on the left side portion. The No. 3 and No. 4 saw assemblies are mounted on a carriage assembly 13 which is arranged for longitudinal movement on the main frame 11. The No. 4 saw is located on the right side portion, while the No. 3 saw is located on the left side portion.

The machine further includes a front conveyer assembly 15, an intermediate conveyer assembly 17, and a carriage conveyer assembly 19. These conveyer assemblies are identical, with the exception that the front conveyer assembly 15 is fixed to the main frame structure 11, while the intermediate conveyer assembly 17 is movable longitudinally of the main frame structure, and the carriage conveyer assembly 19 is mounted onto the carriage assembly 13 for movement therewith.

The machine further includes a conveyer drive assembly 21, an intermediate conveyer longitudinal transverse drive assembly 23, a carriage drive assembly 25, a front hood assembly 27, a carriage hood assembly 29, and a machine control assembly 31.

The machine main frame structure 11 includes a pair of base members 33, a pair of side members 35, a plurality of transverse brace members 37, a plurality of upright members 39, and a front end extension structure 41. The base members 33 are parallel spaced juxtaposed channel members running the length of the machine less the front extension, and rest on the floor or other bearing surface upon which the machine is located. The transverse brace members 37 extend mutually parallel and bridge between and rest upon the base members at convenient spaced intervals along the base member length, being fixed to the base members, as by welding. The upright support members 39 rest, one on each end portion of each brace member 37, and extend upwardly therefrom in generally mutually spaced parallel relation. Each upright support member 39 is fixed to the respective brace member 37, as by welding. The side members 35 extend in juxtaposed mutually parallel spaced relation the length of the machine less the front extension. Each side member 35 is fixed, as by welding, to the inner sides of a respective set of upright members, so as to extend generally in juxtaposed parallel spaced relation above a respective base member. The precise nature of the main frame structure 11 is not a critical part of this invention, the principal requirement being only that the main frame structure be sufficiently strong and rigid to serve its purpose. As shown, the base members 33 and brace members 37 are made of steel channel stock, while the upright members 39 and the side members 35 are of modified channel form. More specifically, each side member 35 has a central or web portion 43, a short bottom side 45, and a longer top side 47, with an inwardly and downwardly sloping flange 49 extending from and integral with the top side. The outer face of the respective side member central portion is fixed to the inner faces of the respective upright members, so that the upper end portions of the upright support members merge with the upper margin of the respective side member central portion. Fixed, as by welding, to the central portion of the inner face of the web portion 43 of each side member 35 and extending the length of the respective side member and parallel thereto is a rack rail 51 having gear teeth 53 on its bottom face. A section of a side member 35 showing details of its structure and the rack rail 51 may be seen in FIG. 13. The rack rails 51 serve a two-fold purpose. First, they serve as rails for the carriage assembly 13 and the intermediate conveyer 19 to run on, and second, they provide gears for the carriage drive pinions 55 to act upon to traverse the carriage assembly 13 longitudinally along the side members 35. One carriage drive pinion 55 is shown in FIG. 13.

The front end extension structure 41 includes a pair of juxtaposed parallel spaced side sheet members 57 made of heavy gauge metal plate stock. These side members 57 have the general shape of an isosceles triangle with one side margin fixed, as by welding, to a respective front end upright member 39, the other side margin extending frontwardly from said respective support member in line with the upper margin of a respective main frame side member 35 for most of its length and then merging with an integral upward extension portion 59. The base margin of the respective side sheet member 57 extends upwardly and frontwardly from the lower end of the respective upright member 39. These front end extension side sheet members 57 are suitably re-enforced and braced by means not shown, so that the structure is sufficiently rigid for its purpose. The upward extension portions 59 of the side sheet members 57 serve as a base for supporting the front hood assembly 27, a portion of the control assembly 31, and a front hold-down ski assembly 61.

As hereinbefore stated, the machine has four saws. No. 1 and No. 2 saws are located at the front of the machine, and No. 3 and No. 4 saws are mounted on the carriage 13. Each of the saw assemblies includes a respective saw blade 63, a respective electric motor 65, and a respective pivot arm structure 67, 69, 71, 73. In addition, each of the saw assemblies except No. 3 includes a sector gear 75 (FIGS. 8, 10 and 12), a sector drive pinion 77, a respective crank 79, 81, 83, a brake mechanism 85 (FIG. 11), and an indicia scale 87, 89, 91.

Figure 10:
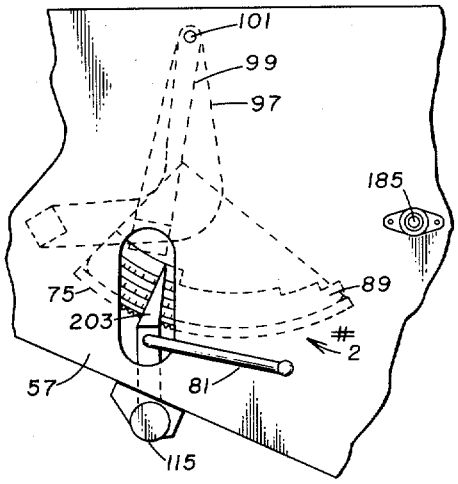
FIG. 10 is a fragmentary schematic view showing details of the No. 2 saw angle positioning mechanism.
Figure 12:
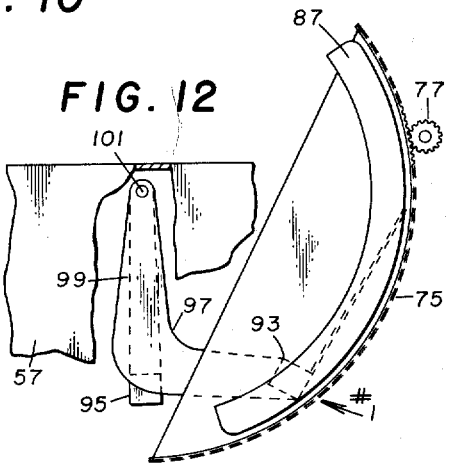
FIG. 12 (Sheet 5) is a fragmentary schematic view showing details of the angle positioning mechanism for the No. 1 saw.

As best seen in FIGS. 2, 10 and 12, the pivot arm structure for No. 1 and No. 2 saws includes a respective cross-bar 93, 95 and a respective pair of cross-bar support arms 97, 99. The cross-bar is in each case fixed at its ends to the lower ends of the respective arms. The upper ends of the support arms 97, 99 are pivotally fixed to the side sheet members 57 at 101. As seen in FIGS. 10 and 12, the support arms 99 for the No. 2 saw are straight, while the support arms 97 for the No. 1 saw are L shaped. Also, it may be noticed that the support arms 97, 99 for the No. 1 and No. 2 saws are pivoted on a common axis 101 and that the cross-bar 95 for the No. 2 saw pivots inside the cross-bar 93 for the No. 1 saw. In each case, the saw blade 63 is mounted on the electric drive motor output shaft, and the electric drive 65 motor is mounted to a bracket which is in turn mounted to the respective cross-bar 93, 95. The bracket in each case is arranged (by means not shown) to allow minor saw blade positioning adjustment for calibration purposes. In addition, the No. 2 and No. 3 saws have a special crank operated vertical adjusting mechanism 103 (FIG. 26), as will be hereinafter more fully explained.

Figure 8:
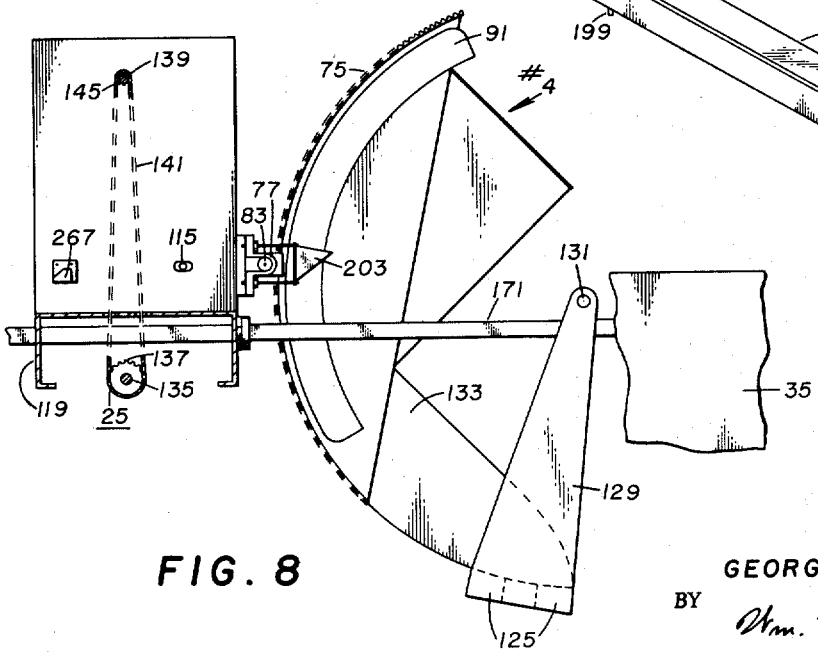
FIG. 8 (Sheet 3) is a fragmentary schematic side elevational view showing the angle positioning mechanism for the No. 4 saw and the carriage drive mechanism.

As before stated, each of the saw assemblies except No. 2 has a sector gear 75 which is fixed to the respective pivot arm structure adjacent one end thereof and driven by a gear pinion 77 which is turned by a respective crank 79, 81, 83, to establish the desired angular position of the respective saw. The sector gear for No. 1 saw is shown in FIG 12; the sector gear for No. 2 saw is best seen in FIGS. 10 and 11; and the sector gear for No. 4 saw is best seen in FIG. 8. The view of FIG. 12 is that of a portion of the machine looking from the right side at the No. 1 and No. 2 saw common pivot axis 101, with portions of the right side sheet members 57 broken away. The view of FIG. 10 is taken looking at the No. 2 saw crank 31 from the left side of the machine, with some parts behind the left side sheet member 57 shown in phantom.

Each of the saw assemblies except No. 2 also has a brake assembly 85 (FIG. 11). The purpose of the brake assembly in each case is to lock the respective sector gear 75 at any chosen angular position. A typical such brake is best shown by FIG. 11, which is a perspective view of the No. 2 saw sector gear and brake mechanism, looking upward, frontward, and leftward, from a point inside the machine.

As seen in FIG. 11, the brake mechanism is made up of a first metal block 105 which is fixed to the main frame structure and lies immediately beneath the sector gear 75; a second metal block 107 juxtaposed relative to and spaced inwardly from the first block and extending above the sector gear lower extremity so as to be engageable with the sector gear side face surface 109. A bolt 111 is passed through the upper portion of the second block 107 and is fixed to the first block 105, the hole in the second block through which the bolt passes being large enough to allow some rocking movement of the second block 107. A screw 113 is threaded through the first block 105 at the block lower end portion and bears at its end against the second block lower end portion. The screw 113 extends to the machine main frame exterior and has a control knob head 115. To lock the brake mechanism, the control knob head 115 is rotated clockwise, forcing the lower end of the second block 107 outward and the upper end inward into tight friction engagement with the sector gear side face 109. To unlock the brake, the control knob 115 is rotated counterclockwise. The saw angular positioning cranks 79, 81, 83 and brake control knobs 115 for the No. 1, 2 and 4 saws respectively, may be seen in FIG. 2.

Figure 6:
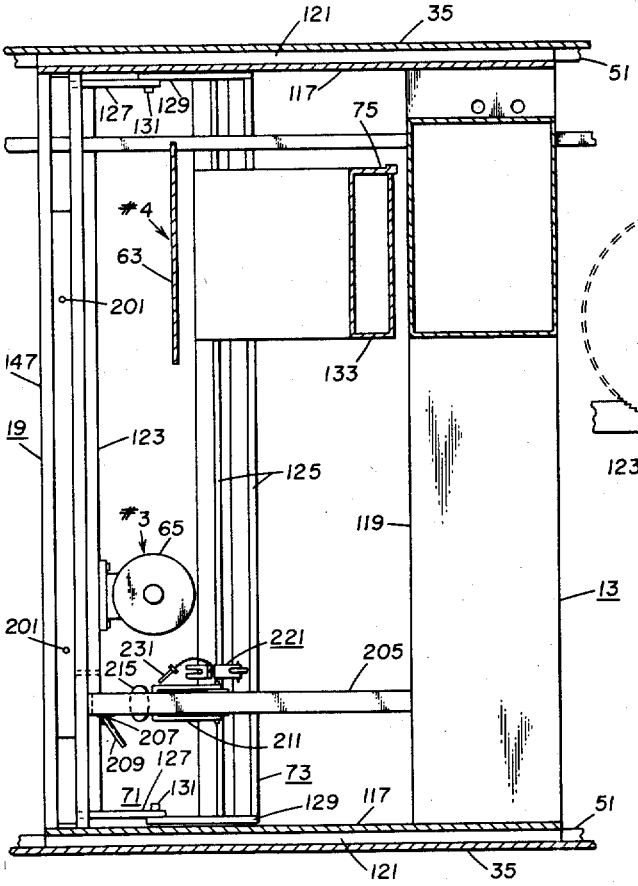
FIG. 6 is a schematic plan view, partially in section, showing portions of the carriage for the linearly movable saws.
Figure 9:
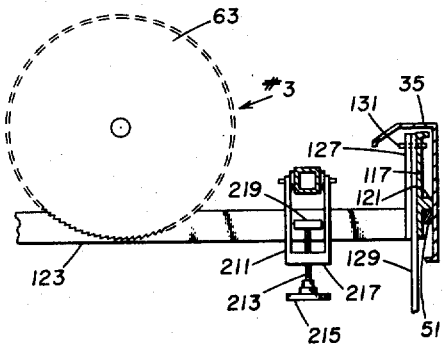
FIG. 9 is a schematic fragmentary view showing details of the carriage and the No. 3 saw positioning mechanism.

As hereinbefore stated, No. 3 and No. 4 saws are mounted on the carriage 13 for traverse longitudinally of the main frame structure 11. The carriage assembly structure is best shown by FIG. 6 and FIG. 9. FIG. 6 is a plan view of the carriage assembly looking down from a horizontal plane located just beneath the main frame side member flange portion 49. All parts above this plane have been removed for clarity. The carriage assembly 13 includes a pair of juxtaposed parallel space side members 117 held in rigid spaced relation by a rear cross beam 119 and a carriage conveyor frame 19. The side members 117 have an outwardly turned flange at their top edge, and have a heavy metal rod 121 of rectangular cross section fixed to their outside faces just below the middle thereof and extending horizontally the length of the side member 117. These rods 121 rest on the upper faces of the rack rails 51 and are slideable thereon. If desired, fiber, plastic, or other suitable material can be fixed to the underside of the rods to reduce the rod-to-rail friction. The rear cross beam 119 is simply a large inverted channel member, as can be seen in FIG. 8. The cross beam 119 and the carriage conveyor frame 19 both bridge between the carriage side members 117. The carriage conveyor frame 19 will be hereinafter more fully described.

Figure 26:
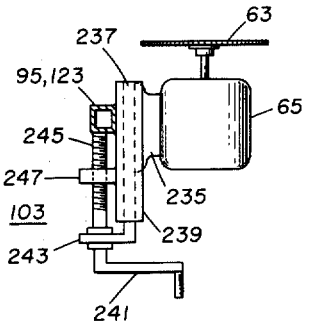
FIG. 26 (Sheet 4) is a schematic elevational view showing details of vertical adjustment means for No. 2 and 3 saws.

The pivot arm structures for No. 3 and No. 4 saws include a respective cross-bar 123, 125 and a respective pair of cross-bar arms 127, 129. The cross-bar is in each case fixed at its ends to the lower ends of the respective support arms. The upper ends of the support arms are pivotally fixed to the carriage side members 117. As seen in FIGS. 1, 6, and 8, the arms for both No. 3 and 4 saws are straight but the No. 4 support arms are longer, and the No. 4 pivot arm structure is generally heavier, since it must support a larger saw for a purpose hereinafter more fully explained. The support arms for the No. 3 and the No. 4 saws are pivoted on a common axis 131, and the No. 3 saw pivot support structure pivots inside (on a shorter radius than) the No. 4 saw pivot structure (see FIG. 7). The No. 3 saw drive motor 65 is fixed to a bracket which is in turn fixed to the crossbar 123, with provisions (not shown) for minor calibration adjustment, and provisions for vertical adjustment as shown by FIG. 26 to be hereinafter explained. The No. 4 saw is fixed to an extension arm structure 133 which is in turn fixed to the respective cross-bar 125 (see FIG. 7). This extension arm mounts the respective sector gear 75 and indicia scale 91 as shown by FIG. 8, which is a schematic fragmentary side elevational view looking into the machine at the right side of the carriage, with the carriage side members and the main frame side members removed for clarity. As above mentioned, No. 3 saw has no sector gear but may assume three operational positions as will be hereinafter explained.

Figure 4:
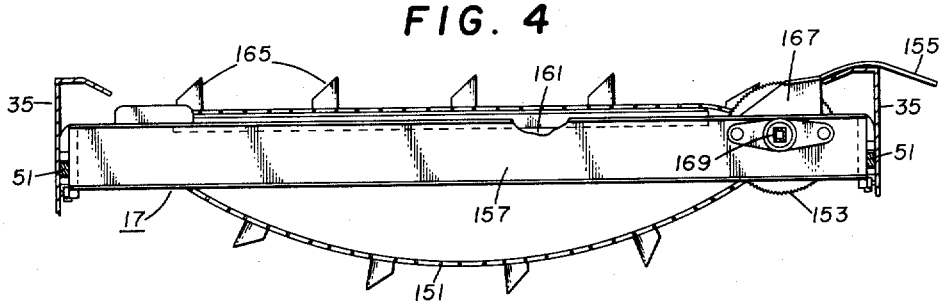
FIG. 4 is a front elevational view, partially in section, showing a typical conveyor.
Figure 5:
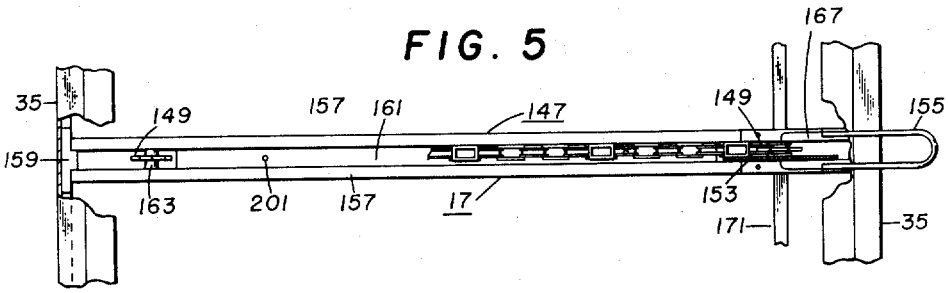
FIG. 5 is a schematic plan view of the conveyor of FIG. 4, with portions broken away.

The carriage 13 is driven along the rack rails 51 (FIG. 13) by a carriage drive assembly which includes a drive shaft 135 (see FIG. 8), a pair of gear pinions 55, the rack rails 51, a pair of sprockets 137, 139, a drive chain 141, and a crank 143 (FIG. 2). The drive shaft 135 is journalled on bearings (not shown) and is fixed to the carriage underneath the carriage rear cross beam 119. The gear pinions 55 are fixed on the drive shaft 135 adjacent the outer ends thereof and engages the rack rails 51. The first sprocket 137 is fixed to the right end of drive shaft 135 and has thereon a drive chain 141 which extends upwardly and over the second sprocket 139 which is fixed to a crank shaft 145 which carries a crank 143. Rotation of the crank 143 then will cause the carriage 113 to traverse longitudinally of the main frame structure 11. As before stated, the conveyor assemblies are all alike except for the fact that the front one is fixed to the main frame structure 11, the intermediate one 17 is arranged to traverse longitudinally of the main frame structure, and the rear one 19 is fixed to the carriage 13. A typical one of the conveyor assemblies (the intermediate one 17) is shown by FIGS. 4 and 5. Each conveyor assembly includes a frame 147, a pair of sprockets 149, a conveyor chain 151, a lift wheel 153 and a discharge guide 155. The conveyor frame 147 is made up of a pair of juxtaposed parallel spaced channel members 157 disposed in back-to-back relation. The channel members 157 are held in rigid spaced relation by spacer block 159 located at each end portion, and a central spacer member and chain or shoe support 161. A respective sprocket 149 is journalled on a respective transverse shaft 163 which is fixed to the channel members 157 in the spaces between the central spacer member 161 and the end spacer block 159. The conveyor chain 151 runs on the sprockets 163, and has a plurality of dogs 165 fixed to and projecting outwardly from it at spaced intervals. The conveyor chain 151 moves in the direction from left to right across the machine, with the inner surface of the chain resting on the central spacer upper surface so that the material being conveyed is held at a constant level. Also, the front (right) faces of the dogs 165 are square with the chain 151 so as to provide a surface for holding the material in the proper position for cutting. The lift wheel 153 is mounted to the shaft 163 of the right-hand sprocket 149 to rotate with same and lift the conveyed material upwardly and onto the discharge guide 155. The discharge guide is simply a piece of heavy circular rod material bent to have a U shape, with the ends of the U fixed to a pair of bracket members 167 which are in turn fixed to the upper surfaces of the conveyor frame channel members 157. The discharge guide 155 is shaped in profile so as to guide the material off the lift wheel 133 and up over the carriage main frame side member 35. The left-hand conveyor sprocket is an idler while the righthand sprocket and the lift wheel 153 are driven. Both the righthand sprocket and the lift wheel have a rectangular central opening 169 through which a rectangular drive shaft 171 is passed. The drive shaft 171 is journalled on a plurality of bearings 173 (FIG. 2) which are fixed to the inner side of the righthand main frame side member 35. The drive shaft 171 extends the length of the side member 35 and parallel thereto.

Figure 25:
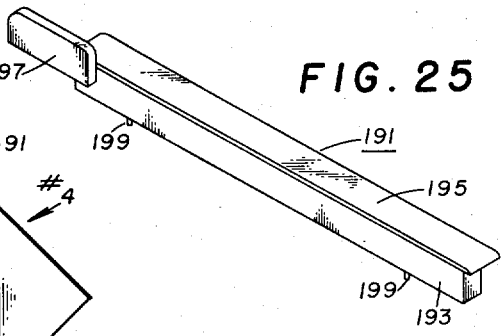
FIG. 25 (Sheet 3) is a schematic perspective view of a conveyor shoe.

The conveyor drive shaft may be driven in any convenient manner. In the embodiment shown, it is driven by an electric motor and gear reduction 175 (FIGS. 1 and 2) mounted on the rear main frame brace member 37 and having a first pulley 177 mounted on its output shaft, which pulley carries a V belt 179 which engages a second pulley 181 which is fixed to the right end of the conveyor drive shaft 17. The conveyer frame channel members 157 are notched at their outer end portions to receive the rack rails 51 (see FIG. 4). The intermediate conveyer 17 is provided with suitable bearing shoes (not shown) so that it is supported in slideable relation by the rack rails 51. All three conveyers 15, 17, 19 are mounted at exactly the same level, and the chain dogs 165 are precisely aligned so that the material is conveyed in proper position for cutting. The intermediate conveyer 17 is provided with a longitudinal traverse drive assembly which comprises two pairs of sprockets 183 (FIG. 3), two drive shafts 185 (FIG. 11), two drive chains 187, and a crank 189 (FIG. 2). The drive shafts 185 are journalled to the main frame side members 35, one near the front and one near the rear of the side frame members extending transversely thereof. A pair of sprockets 183 is fixed to each drive shaft 185 adjacent the end thereof. A respective chain 187 extends from each side of the intermediate conveyer frame 147, forward and over the respective front sprocket 183, then rearward and over the respective rear sprocket 183 and then back to the conveyer frame 147. The crank 189 is fixed to the front drive shaft 185 at the right side of the machine. Rotation of the crank 189 causes the intermediate conveyer 17 to traverse longitudinally of the machine. Thus, the intermediate conveyer 17 may be readily positioned in any desired manner relative to the other conveyers 15, 19. In order to make possible more than one conveyer chain level for making heel cuts on bottom roof truss chords, heel shoe inserts 191 such as the one shown by FIG. 25 are provided. Each heel shoe insert is made up of a rectangular bar 193, a top runner 195 and a handle 197. The bar 193 is the same length as the conveyer frame central spacer 161 and sufficiently lesser in width to provide convenient clearance with channel members 157. The runner 195 is fixed to the top surface of the bar 193 and is slightly wider and longer than same, having rounded ends. The handle 197 is fixed to the rear side of the bar 193 at its left end portion. The height of the bar 193 depends upon the distance it is desired to raise the conveyer chain level for a particular job. A pair of dowels 199 are fixed to the bottom side of the bar 193 to mate with corresponding holes 201 in the top surface of the conveyer frame central spacer member 161.

As before stated, each of the No. 1, No. 2, and No. 4 saw assemblies includes a sector gear 75 and associated mechanism for moving the respective saw to any desired angular position within its range. Also, each sector gear 75 has an indicia scale 87, 89, 91 fixed to its outer face, which scale is visible to the operator while rotating the respective cranks 79, 81, 83. Also, for each indicia scale there is provided a fixed reference marker 203 such as those shown in FIGS. 8 and 10.

The No. 3 saw assembly does not have a sector gear, but is arranged to assume any one of three positions. These positions will be referred to herein as the horizontal, vertical, and right angle positions. When in the horizontal position, the No. 3 saw blade is lying in a horizontal plane; when in the vertical position the No. 3 saw blade is lying in a vertical plane; and when in the right angle position the No. 3 saw blade is maintained at right angles with respect to the No. 4 saw blade. The mechanism for positioning the No. 3 saw can best be seen in FIGS. 6, 7 and 9. As seen in FIG. 6, the carriage frame 13 includes a transverse brace member 205 in the form of an inverted U channel which bridges between and is fixed at its ends to the rear cross beam 119 and the conveyer frame 147. Fixed to the left side of this transverse brace member 205 and adjacent its forward end is a sleeve 207 having its bore disposed in vertical position. Cooperating with the sleeve is an inverted L shaped retainer pin 209. In order to secure the No. 3 saw in its horizontal position, its pivot arm cross bar 123 is swung to the 9:00 o'clock position (as viewed from the left side of the machine) and the retainer pin 209 is lowered to its rest position in the cooperating sleeve 207. The sleeve 207 is positioned just such that one side of the lower end of the retainer pin 209 will now bear snugly against the pivot arm cross-bar 123 to hold same fixed at the 9:00 o'clock position.

To retain the No. 3 saw in the vertical position there is provided a special retainer mechanism including a U shaped bracket 211 which is pivotally fixed at its upper ends to the sides of the carriage transverse brace member 205 and depends therefrom. A heavy retainer screw 213 (FIG. 9) having a control knob head 215 is threaded through the base 217 of the bracket 211 so as to extend inside the bracket between its sides. A metal tab protrusion 219 is provided on the front side of the pivot arm cross-bar 123 immediately beneath the carriage transverse brace member 205. When the pivot arm cross-bar 123 is swung into a position such that the No. 3 saw is in vertical position, the retainer bracket 211 is swung so that the tab protrusion 219 extends into the space between the bracket arms. The upper end of the retainer screw 213 can then bear against the underside of tab protrusion 219. The retainer screw 213 has been pre-adjusted to the exact proper position such that when the tab protrusion 219 is bearing on the upper end of the screw, the No. 3 saw blade is vertical. The weight distribution on the pivot arm is such as to tend to rotate same in the clockwise direction against the holding action of the retainer bracket 211 and screw 213. This tendency, plus the fact that the retainer bracket sides bear against the pivot arm cross-beam face, assure that the No. 3 saw will be held firmly in the vertical position.

Figure 7:
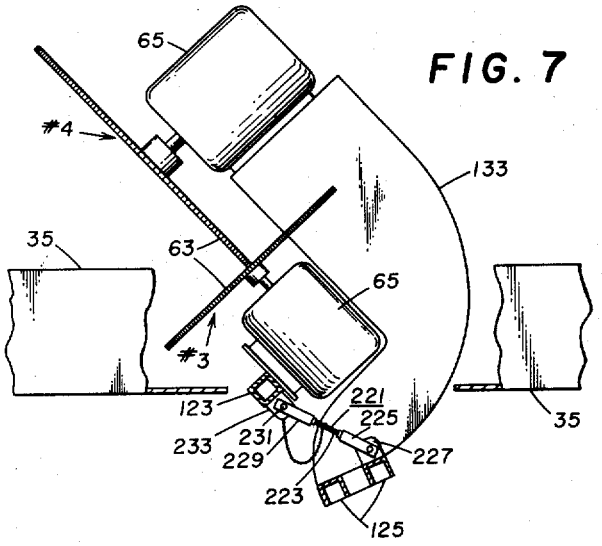
FIG. 7 is a fragmentary side elevational view showing details of the linearly movable saws.

To retain the No. 3 saw in the right angle position, the pivot arm cross-member 123 of the No. 3 saw is linked to the pivot arm cross-member 125 of the No. 4 saw (see FIG. 7). This linkage 221 includes a turnbuckle 223 having a clevis at each end thereof. The first clevis 225 is pivotally fixed to a tab protrusion 227 which in turn is fixed to the upper rear face of the No. 4 saw pivot arm across beam 125 at a region immediately below and to the right of the carriage transverse brace member 205. The second clevis 229 is removably fixed by means of a retainer pin 231 to a tab protrusion 233 which in turn is fixed to the lower face of the No. 3 saw pivot arm across beam 123. The turnbuckle 223 is adjusted to length such that when the second clevis 229 is pinned to the No. 3 saw pivot arm cross beam 123, the No. 3 saw blade is precisely at right angles with respect to the No. 4 saw blade. Thus, as the No. 4 saw is moved through its range of angular positions, the No. 3 saw moves through the same angular range but displaced 90°.

As before mentioned, the No. 2 and No. 3 saws have a vertical adjusting mechanism, as shown by FIG. 26. In some cases only a single cut is made on one or both ends of the conveyed material. In such cases, the single cuts are always made by the No. 1 and 4 saws, and the No. 2 and 3 saws must be moved out of the way of the material. To accomplish this, the No. 2 and 3 saws are first moved to the horizontal blade position, and then lowered down out of the way by the vertical adjusting mechanism. In FIG. 26, the bracket 235 to which the motor 65 is fixed is slideable in a grooved channel 237 located in the front face of a second bracket 239 which in turn is fixed to the respective saw pivot arm cross beam 95, 123. A screw crank 241 is journaled on a projection 243 of the motor bracket 235 which extends below and to the rear of the second bracket 239. The threaded portion 245 of the screw crank 241 extends upwardly behind the second bracket 239 and threads through a tab protrusion 247 which is fixed to the rear face of the second bracket 239. Thus, as the crank 241 is turned, the motor 65 slides up or down in the groove channel 237. The lower face of the respective pivot arm cross beam 95, 123, serves as a stop, so that when the threaded portion 245 of the screw crank 241 is bearing on the cross beam, the respective saw is at its proper operating level.

The hood assemblies 27, 29, as shown in FIG. 1, serve primarily to protect the machine operator from wood scraps that may be thrown out by the saws. The hood assemblies form no critical part of the present invention and so will not be described in detail herein.

As the conveyed material is passed through the saws it needs to be held firmly in proper cutting position. To aid in this function there is provided a pair of material hold-down ski assemblies 61. The hold-down skis 249 are located so as to be near the cuts on each end of the conveyed material. Each ski assembly is mounted on a respective hood frame and depends therefrom (see FIG. 1). Each ski is spring-biased so as to have some flexibility in the vertical direction and yet always apply pressure to the top side of the conveyed material. Also, the skis are provided with some vertical adjustment to take care of different material widths. This vertical adjustment in the embodiment shown is accomplished by means of a short rack and pinion arrangement. In order to properly position the conveyed material in the longitudinal direction, a material stop guide 251 is provided at the conveyer level on the left front region of the machine (see FIG. 2). Each piece of conveyed material is moved over against this stop as it is loaded onto the conveyer. In order that the conveyed material may pass freely over the saw blades as the respective cuts are made, the saw blades are all mounted so that their outer faces present a smooth surface, with no shaft or retainer nut protrusions. The machine is provided with suitable ejector mechanisms for disposing of the material scraps as they are cut, but such ejector mechanism is not part of the present invention and therefore has not been shown or described.

The electric control assembly includes a start-stop switch 253 (FIG. 1) for each saw motor plus a start-stop switch 255 and a controller 257 for the conveyer motor. These switches are connected to a power source (not shown) and by electric cables to the respective motors. The electric cables for the No. 3 and No. 4 motors are carried by a conduit 259 fixed to a machine main frame side member 35 to terminal boxes 261, from whence loop cables (not shown) connect to the motors, allowing freedom of carriage movement. The conveyer controller has a control handle 263 which has a neutral, forward, and reverse position, so that the operator may at all times have full control of the material being conveyed. The position of the carriage 13, determining the length of the finished pieces of conveyed material is indicated at all times by a simple linear tape scale 265 which is marked in feet, inches, and inch fractions. This tape scale 265 is fixed to the upper flange portion of the right-hand main frame side member, and extends substantially the length of the machine. A pointer 267 located on the carriage structure (see FIG. 8), indicates the position of the carriage 13 relative to the linear tape scale 265.

In order to best explain the operation of the present invention, particular reference will be made to FIGS. 17 through 24. Since the machine as shown and described is set up in particular for cutting roof truss members, its operation will be explained in that connection. It will be apparent, however, that the principles of the present invention may also be applied to the cutting of other types of building component members as well.

Figure 22:
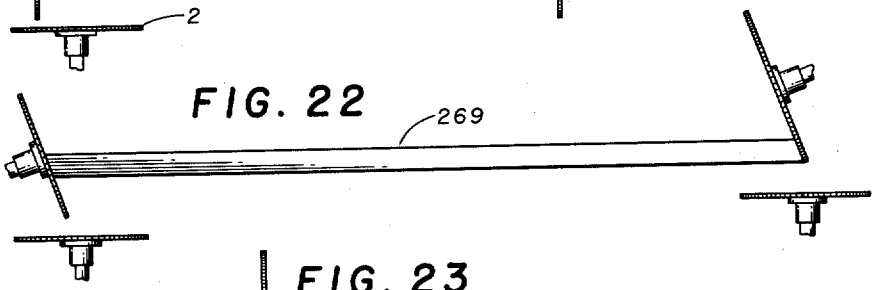
Figure 20:
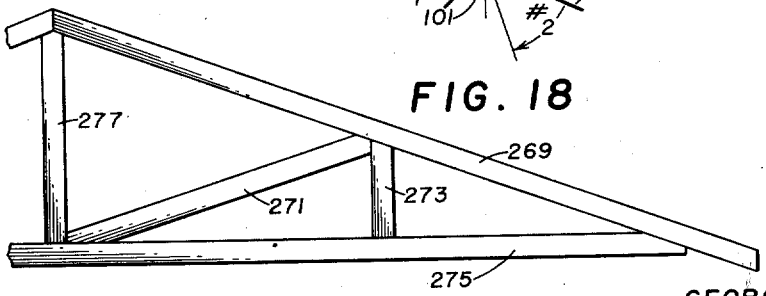
FIG. 20 is a fragmentary schematic side elevational view of a typical roof truss.

In FIG. 20 there is shown a typical side of a roof truss of the "kingpost" type. The component members of this roof truss are commonly referred to as the top chord 269, the B web 271, the C web 273, the bottom chord 275, and the kingpost 277. To set the machine up to cut top chord component members 269, with slope and span known, the operator consults a pre-calculated specification data sheet provided with the machines, and notes the member length and the indicia setting for each of No. 1 and No. 4 saws. Since only a single cut is required at each end, the No. 2 and No. 3 saws are moved to their horizontal positions and cranked down below the conveyor level. The No. 1 and No. 4 saws are then cranked to the proper settings and locked. The carriage 13 is then traversed until the tape indicator 267 reads the given member length. Then the first piece of lumber is placed on the conveyor and moved over against the stop 251. The conveyor motor 175 is then started and the conveyor 15, 17, 19 is advanced until the lumber is beneath the near ends of the skis 249. Then the skis are adjusted to have siutable bearing pressure on the lumber top face. Next, the No. 1 and No. 4 saw motors are started and allowed to reach full speed. Then the conveyor is advanced so that the cuts are made to produce the top chord member. Then the finished member is checked for accuracy, to make sure the machine is set up correctly. Next, the conveyor is again started, and lumber pieces are loaded on the conveyer and moved through the machine in mass production fashion. The profile of the saws for cutting the typical top chord 269 is shown in FIG. 22.

It should be noted that the workpieces are fed from the left side of the machine by being placed or moved onto the conveyors 15, 17, 19, the level of which is slightly below the level of the upper extremities of the main frame side members 35 as may be seen from FIG. 8. The pivot 131 is also beneath the upper extremity of the main frame side members 35. The same is true for pivot 101, as will be apparent from FIGS. 10 and 12. However, as is readily apparent from FIGS. 2 and 6, the space between the pivots 101 and 131 is clear, so that once a workpiece is lifted over the side 35 of the machine and placed down on the conveyor, it can move freely through the saws and then be lifted out on the far side of the machine by means of the conveyor lift wheels 153 (see FIG. 4) and the discharge guides 155.

Figure 21:
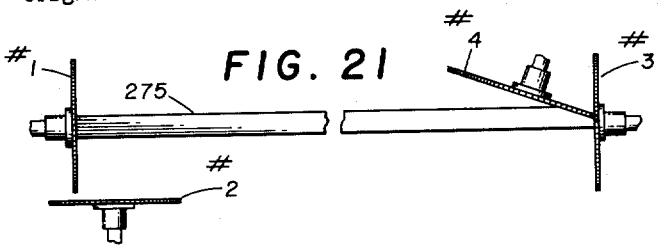
FIGS. 21 through 24 (Sheet 6) are schematic views illustrating the cutting of the various members of the roof trusses of FIG. 20.

Next, to set the machine up to cut the typical bottom chord member 275, the operator again consults the specification sheet and notes the indicia settings and length. The No. 1 saw is moved to the proper indicia position and locked. The No. 2 saw remains out of play. The No. 3 saw is moved to its vertical position. The No. 4 saw is moved to the proper indicia position and locked. Then the carriage is traversed to the proper tape reading. Next the proper set of heel shoes 191 is inserted in the conveyors. Then the test piece of lumber is run through the machine and the results checked, as before. Then production pieces are run in the same manner as before. The saw profiles for cutting the typical bottom chord member 275 are shown by FIG. 21.

Figure 23:
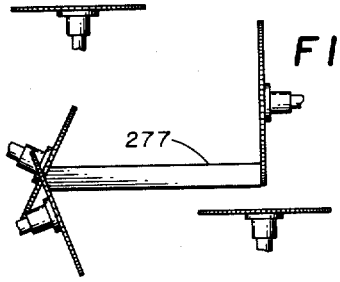

Next, to set the machine up to cut the typical kingpost member 277, the operator again consults the specification sheet and notes the indicia settings and length. The No. 1 saw is moved to the proper indicia position and locked. The No. 2 saw is cranked up to operating position and then rotated to the proper indicia position and locked. The No. 3 saw is moved to the horizontal position and cranked down out of play. The No. 4 saw is moved to the proper indicia setting and locked. The carriage is traversed to the proper tape length reading and the heel shoes 191 are removed. Then the test piece is cut and checked as before. Then production pieces are run through the machine in the same manner as before. The profiles of the saws for cutting the typical kingpost member 277 is shown by FIG. 23.

The machine set up for cutting the typical C web member 273 is the same as that for the top chord 269 except for length and angular postion of the No. 1 saw. The minimum length C web that can be cut with a standard machine is about 32 inches. For cases where the C web is less than 32 inches long (which is the case with our typical truss member) either one of two procedures may be followed. First, the top chord members can be cut with enough drop-off at the righthand end to make a C web.

Figure 24:
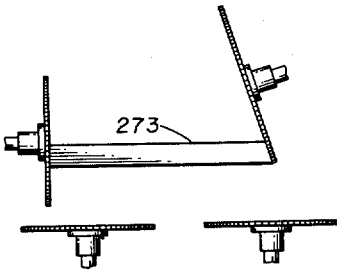

This drop-off will have the correct angle, and can be cut to correct length with a chop saw. Alternatively, a top chord can be made twice as long as the desired C web and then cut in half with a chop saw. The profile of the saws for cutting a minimum length C web 273 is shown by FIG. 24.

To set up the machine for cutting the typical B web member 271, the operator again consults the specification sheet and notes the saw indicia settings and length. The No. 3 saw is moved to its right angle position (its pivot arm cross beam linked to the pivot arm cross beam of No. 4 saw). Then No. 1, 2 and 4 saws are moved to the proper indicia settings and locked. The carriage is then traversed to the proper tape length reading. Then the test piece is cut and checked as before. Then production pieces are run through the machine in the usual manner. The profiles of the saws for cutting the typical B web member 271 are shown in perspective in FIG. 17.

Figure 17:
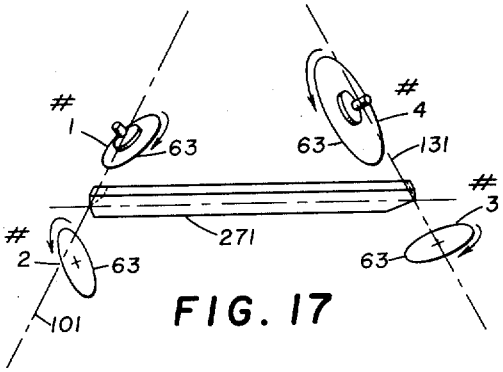
FIG. 17 is a schematic perspective view to aid in explanation of the principles of the invention.

As hereinbefore mentioned, the pivot arms for the No. 1 and No. 2 saws have a common pivot axis 101, and the pivot arms of the No. 3 and No. 4 saw have a common pivot axis 131. Now each saw when in operating position is fixed relative to its pivot arm so that its blade is contained by the respective common pivot axis. The common pivot axis may pass through a diameter of the saw or it may pass through a chord. The common pivot axis 101 for the No. 1 and No. 2 saw and the common pivot axis 131 for the No. 3 and No. 4 saw are shown in FIG. 17. As shown, the common pivot axis for the No. 1 and No. 2 saws passes through chords of the saw blades, and the common pivot axis for the No. 3 and No. 4 saw passes through a diameter of the No. 3 saw and a chord of the No. 4 saw. The positioning of the saw blades relative to the respective pivot axes as shown by FIG. 17 has been determined as convenient for the truss cuts the machine is particularly set up to make. Other relative saw blade to common axis positions might be used for different machine cutting jobs. The important thing in all cases is that the respective common pivot axis contain the respective saw blades.

Figure 18:
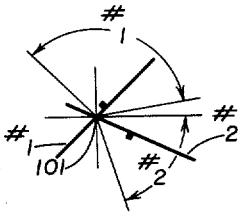
FIG. 18 is a diagram illustrating the angular adjusting ranges and pivot axis position for the No. 1 and No. 2 saws.
Figure 19:
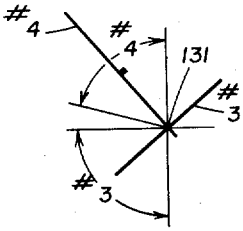
FIG. 19 is a diagram illustrating the angular adjusting ranges and pivot axis position for the No. 3 and No. 4 saws.

The range of angulation of the No. 1 and No. 2 saws is shown in FIG. 18, while the range of angulation of the No. 3 and No. 4 saws is shown in FIG. 19. Further, the common pivot axis 101 and relative saw blade positions for the No. 1 and No. 2 saws is shown in FIG. 18, and the common pivot axis 131 and relative saw blade positions for the No. 3 and No. 4 saws is shown in FIG. 19. It may be noted that No. 3 saw is either in the horizontal (0 degree) position or the vertical (90 degree) position or it may traverse the angular range of the No. 4 saw but at right angles to the No. 4 saw throughout this range. The common pivot axes of the two pairs of saws are at the precise same level and are mutually parallel, and are at a chosen level relative to the conveyer level. This means that the desired line of merger of two cuts made at an end of the conveyed member will contain the respective common axis. Further, for a given carriage position, the distance between the lines of intersection of pairs of saw cuts remains the same regardless of the angular positions of the saws. The result is that the saws may be set up in any angular relation, for cutting any one of many types of truss members, and the length of the member may always be set by simply traversing the carriage to where its pointer indicates the desired length on the linear tape 265.

*It will be seen that the angular adjustment of saws No. 1 and No. 2 about the common pivot axis 101, and the angular adjustment of saws No. 3 and No. 4 about the common pivot axis 131, is such that the saws are always confined to move along a prescribed path defined as a circular arc the center of which is the respective common pivot axis about which the supporting structure for the respective saw moves.*

Figure 16:
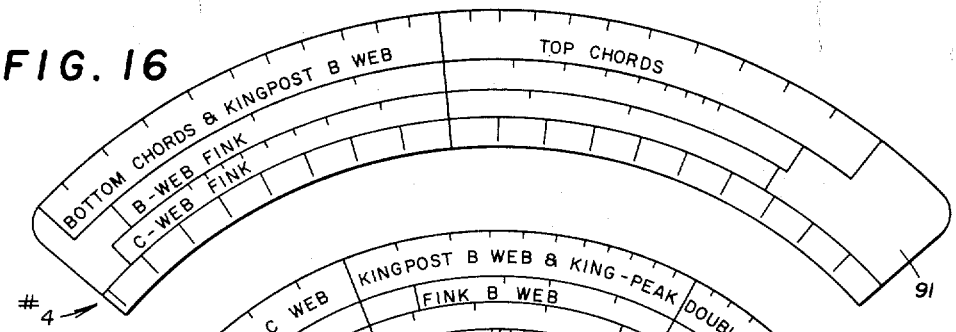
FIGS. 14, 15 and 16 (Sheet 5) are schematic views of the indicia scales for the No. 2, No. 1, and No. 4 saws, respectively.
Figure 15:
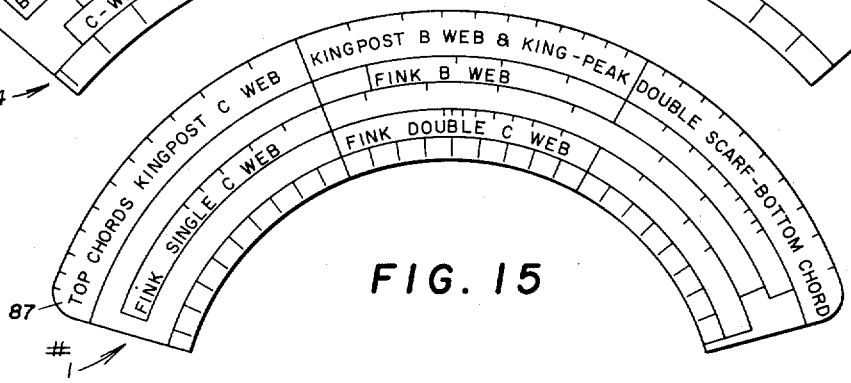
Figure 14:
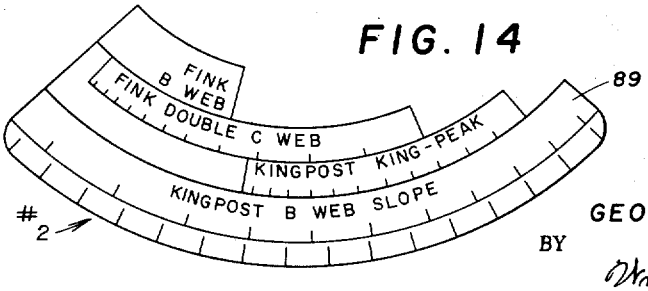

Typical indicia scales for the No. 1, No. 2, and No. 4 saws, are shown by FIGS. 14, 15, 16, respectively. It will be noticed that each indicia scale has a section marked for each truss member of two commonly used types of trusses, namely the "Fink" and the "Kingpost" trusses. Actual number markings on the scales have been omitted for convenience in the drawings, but of course are present on the scales as actually used. The angular setting for a particular saw is readily made by merely matching a pointer with the scale number in the proper scale section as noted from the specification sheet. Such scales, marked directly in truss terms are a great convenience and save significantly on machine set-up time. It is understood that other scales could be supplied for other trusses or component cutting jobs.

It should be mentioned that the saws are preferably displaced one from the other in the direction transverse of the machine main frame such that the cuts on a particular piece of conveyed material are not made simultaneously, but are made in succession, one at a time. This arrangement greatly reduces the machine overall electric power requirements. The No. 4 saw is larger than the others because its blade must have a larger diameter, since in some cases it must make long kerf cuts.

The foregoing disclosure and the showings made in the drawings are merely illustrative of the principles of this invention and are not to be interpreted in a limiting sense.

I claim:

1. A building component member cutting machine comprising a main frame, first and second pivot arm structures pivotally fixed to said main frame about a first common horizontal pivot axis extending transversely of said main frame, first and second electric motor driven circular saws mounted on said respective pivot arm structure such that a chord of their respective blades is coincident with said common pivot axis, a carriage mounted on said main frame for traverse longitudinally of said main frame, third and fourth pivot arm structures pivotally fixed to said carriage about a second common horizontal pivot axis extending parallel to said first common pivot axis and at the same level thereof, third and fourth motor driven circular saws mounted on said respective third and fourth pivot arm structures such that a chord of their respective blades is coincident with said second common pivot axis, a linear tape extending longitudinally of said main frame for indicating the distance between said common pivot axes, a material conveyer traversing said main frame between said saw pairs and at a predetermined level relative to said common pivot axes, and means for fixing said saws in a plurality of predetermined relative angular positions.

2. A building component member cutting machine comprising a main frame, first and second pivot arm structures pivotally fixed to said main frame about a first common horizontal pivot axis extending transversely of said main frame, first and second electric motor driven circular saws mounted on said respective pivot arm structure such that a chord of their respective blades is coincident with said common pivot axis, a carriage mounted on said main frame for traverse longitudinally of said main frame, third and fourth pivot arm structures pivotally fixed to said carriage about a second common horizontal pivot axis extending parallel to said first common pivot axis and at the same level thereof, third and fourth motor driven circular saws mounted on said respective third and fourth pivot arm structures such that a chord of their respective blades is coincident with said second common pivot axis, a linear tape extending longitudinally of said main frame for indicating the distance between said common pivot axes, a material conveyor traversing said main frame between said saw pairs and at a predetermined level relative to said common pivot axes, means for moving each said saw through a predetermined range of angular positions and for retaining each said saw in any selected position within its angular range.

3. A building component member cutting machine comprising a main frame, first and second pivot arm structures pivotally fixed to said main frame about a first common horizontal pivot axis extending transversely of said main frame, first and second electric motor driven circular saws mounted on said respective pivot arm structure such that a chord of their respective blades is coincident with said common pivot axis, a carriage mounted on said main frame for traverse longitudinally of said main frame, third and fourth pivot arm structures pivotally fixed to said carriage about a second common horizontal pivot axis extending parallel to said first common pivot axis and at the same level thereof, third and fourth motor driven circular saws mounted on said respective third and fourth pivot arm structures such that a chord of their respective blades is coincident with said second common pivot axis, a linear tape extending longitudinally of said main frame for indicating the distance between said common pivot axes, a material conveyer traversing said main frame between said saw pairs and at a predetermined level relative to said common pivot axes, means for moving all but one of said saws through a predetermined range of angular positions and for retaining each said saw in any selected position within its angular range, and means for retaining the other said saw in any selected one of a plurality of predetermined positions.

4. A building component member cutting machine comprising a main frame, first and second pivot arm structures pivotally fixed to said main frame about a first common horizontal pivot axis extending transversely of said main frame, first and second electric motor driven circular saws mounted on said respective pivot arm structure such that a chord of their respective blades is coincident with said common pivot axis, a carriage mounted on said main frame for traverse longitudinally of said main frame, third and fourth pivot arm structures pivotally fixed to said carriage about a second common horizontal pivot axis extending parallel to said first common pivot axis and at the same level thereof, third and fourth motor driven circular saws mounted on said respective third and fourth pivot arm structures such that a chord of their respective blades is coincident with said second common pivot axis, a linear tape extending longitudinally of said main frame for indicating the distance between said common pivot axes, a material conveyor traversing said main frame between said saw pairs and at a predetermined level relative to said common pivot axes, means for moving each said saw through a predetermined range of angular positions and retaining each said saw in any selected position within its angular range, and an indicia scale associated with each said saw.

5. A building component member cutting machine comprising a main frame, first and second pivot arm structures pivotally fixed to said main frame about a first common horizontal pivot axis extending transversely of said main frame, first and second electric motor driven circular saws mounted on said respective pivot arm structure such that a chord of their respective blades is coincident with said common pivot axis, a carriage mounted on said main frame for traverse longitudinally of said main frame, third and fourth pivot arm structures pivotally fixed to said carriage about a second common horizontal pivot axis extending parallel to said first common pivot axis and at the same level thereof, third and fourth motor driven circular saws mounted on said respective third and fourth pivot arm structures such that a chord of their respective blades is coincident with said second common pivot axis, a linear tape extending longitudinally of said main frame for indicating the distance between said common pivot axes, means for moving all but one of said saws through a predetermined range of angular positions and for retaining each said saw in a selected position within its angular range, an indicia scale associated with each said saw but one, and means for retaining the other said saw in any selected one of a plurality of predetermined positions.

6. The invention in accordance with claim 4, wherein said indicia scales are graduated in roof truss terms.

7. The invention in accordance with claim 5, wherein said indicia scales are graduated in roof truss terms.

8. A building component member cutting machine comprising a main frame, first and second pivot arm structures pivotally fixed to said main frame about a first common horizontal pivot axis extending transversely of said main frame, first and second electric motor driven circular saws mounted on said respective pivot arm structure such that a chord of their respective blades is coincident with said common pivot axis, a carriage mounted on said main frame for traverse longitudinally of said main frame, third and fourth pivot arm structures pivotally fixed to said carriage about a second common horizontal pivot axis extending parallel to said first common pivot axis and at the same level thereof, third and fourth motor driven circular saws mounted on said respective third and fourth pivot arm structures such that a chord of their respective blades is coincident with said second common pivot axis, a linear tape extending longitudinally of said main frame for indicating the distance between said common pivot axes, a material conveyer traversing said main frame between said saw pairs and at a predetermined level relative to said common pivot axes, means for moving all but said third saw through a predetermined range of angular positions and for retaining each said saw in any selected position within its angular range, and means for retaining said third saw in any selected one of a plurality of predetermined positions, one of which is a fixed position relative to said fourth saw so that said third saw can traverse the angular range of said fourth saw but at a fixed angle relative to said fourth saw.

9. A building component member cutting machine comprising a main frame, first and second pivot arm structures pivotally fixed to said main frame about a first common horizontal pivot axis extending transversely of said main frame, first and second electric motor driven circular saws mounted on said respective pivot arm structure such that a chord of their respective blades is coincident with said common pivot axis, a carriage mounted on said main frame for traverse longitudinally of said main frame, third and fourth pivot arm structures pivotally fixed to said carriage about a second common horizontal pivot axis extending parallel to said first common pivot axis and at the same level thereof, third and fourth motor driven circular saws mounted on said respective third and fourth pivot arm structures such that a chord of their respective blades is coincident with said second common pivot axis, a linear tape extending longitudinally of said main frame for indicating the distance between said common pivot axes, a material conveyer traversing said main frame between said saw pairs and at a predetermined level relative to said common pivot axes, means for moving each said saw through a predetermined range of angular positions and retaining each said saw in any selected position within its angular range, and means for moving and retaining either or both of said second and third saws in an out of play position.

10. A building component member cutting machine comprising a main frame, first and second pivot arm structures pivotally fixed to said main frame about a first common horizontal pivot axis extending transversely of said main frame, first and second electric motor driven circular saws mounted on said respective pivot arm structure such that a chord of their respective blades is coincident with said common pivot axis, a carriage mounted on said main frame for traverse longitudinally of said main frame, third and fourth pivot arm structures pivotally fixed to said carriage about a second common horizontal pivot axis extending parallel to said first common pivot axis and at the same level thereof, third and fourth motor driven circular saws mounted on said respective third and fourth pivot arm structures such that a chord of their respective blades is coincident with said second common pivot axis, a linear tape extending longitudinally of said main frame for indicating the distance between said common pivot axes, a material conveyer traversing said main frame between said saw pairs and at a predetermined level relative to said common pivot axes, means for moving all but one of said saws through a predetermined range of angular positions and for retaining each said saw in any selected position within its angular range, and means for retaining the other said saw in any selected one of a plurality of predetermined positions one of which is an out of play position.

11. A building component member cutting machine comprising a main frame, first and second pivot arm structures pivotally fixed to said main frame about a first common horizontal pivot axis extending transversely of said main frame, first and second electric motor driven circular saws mounted on said respective pivot arm structure such that a chord of their respective blades is coincident with said common pivot axis, a carriage mounted on said main frame for traverse longitudinally of said main frame, third and fourth pivot arm structures pivotally fixed to said carriage about a second common horizontal pivot axis extending parallel to said first common pivot axis and at the same level thereof, third and fourth motor driven circular saws mounted on said respective third and fourth pivot arm structures such that a chord of their respective blades is coincident with said second common pivot axis, a linear tape extending longitudinally of said main frame for indicating the distance between said common pivot axes, a material conveyer traversing said main frame between said saw pairs and at a predetermined level relative to said common pivot axes, means for moving all but said third saw through a predetermined range of angular positions and for retaining each said saw in any selected position within its angular range, and means for selectively linking the pivot arm structure of said third saw to that of said fourth saw so that said third saw may move through the angular range of said fourth saw with a predetermined fixed angular relation between said third and fourth saws.

12. A building component member cutting machine comprising a main frame, first and second pivot arm structures pivotally fixed to said main frame about a first common horizontal pivot axis extending transversely of said main frame, first and second electric motor driven circular saws mounted on said respective pivot arm structure such that a chord of their respective blades is coincident with said common pivot axis, a carriage mounted on said main frame for traverse longitudinally of said main frame, third and fourth pivot arm structures pivotally fixed to said carriage about a second common horizontal pivot axis extending parallel to said first common pivot axis and at the same level thereof, third and fourth motor driven circular saws mounted on said respective third and fourth pivot arm structures such that a chord of their respective blades is coincident with said second common pivot axis, a linear tape extending longitudinally of said main frame for indicating the distance between said common pivot axes, a material conveyer traversing said main frame between said saw pairs and at a predetermined level relative to said common pivot axes, means for moving each said saw through a predetermined range of angular positions and retaining each said saw in any selected position within its angular range, and means for moving the second and third saw blades away from the respective common pivot axes.

13. A building component member cutting machine comprising a main frame, first and second pivot arm structures pivotally fixed to said main frame about a first common horizontal pivot axis extending transversely of said main frame, first and second electric motor driven circular saws mounted on said respective pivot arm structure such that a chord of their respective blades is coincident with said common pivot axis, a carriage mounted on said main frame for traverse longitudinally of said main frame, third and fourth pivot arm structures pivotally fixed to said carriage about a second common horizontal pivot axis extending parallel to said first common pivot axis and at the same level thereof, third and fourth motor driven circular saws mounted on said respective third and fourth pivot arm structures such that a chord of their respective blades is coincident with said second common pivot axis, a linear tape extending longitudinally of said main frame for indicating the distance between said common pivot axes, a material conveyer traversing said main frame between said saw pairs and at a predetermined level relative to said common pivot axes, means for moving each said saw through a predetermined range of angular positions and retaining each said saw in any selected position within its angular range, and crank and screw means for moving the second and third saw blades away from the respective common pivot axes.

14. A building component member cutting machine comprising a main frame, first and second pivot arm structures pivotally fixed to said main frame about a first common horizontal pivot axis extending transversely of said main frame, first and second electric motor driven circular saws mounted on said respective pivot arm structure such that a chord of their respective blades is coincident with said common pivot axis, a carriage mounted on said main frame for traverse longitudinally of said main frame, third and fourth pivot arm structures pivotally fixed to said carriage about a second common horizontal pivot axis extending parallel to said first common pivot axis and at the same level thereof, third and fourth motor driven circular saws mounted on said respective third and fourth pivot arm structures such that a chord of their respective blades is coincident with said second common pivot axis, a linear tape extending longitudinally of said main frame for indicating the distance between said common pivot axes, a material conveyer traversing said main frame between said saw pairs and at a predetermined level relative to said common pivot axes, means for moving all but said third saw through a predetermined range of angular positions and for retaining each said saw in any selected position within its angular range, means for retaining said third saw in any selected one of a plurality of predetermined positions, and means for moving the second and third saw blades away from the respective common pivot axes.

15. A building component member cutting machine comprising a main frame, first and second pivot arm structures pivotally fixed to said main frame about a first common horizontal pivot axis extending transversely of said main frame, first and second electric motor driven circular saws mounted on said respective pivot arm structure such that a chord of their respective blades is coincident with said common pivot axis, a carriage mounted on said main frame for traverse longitudinally of said main frame, third and fourth pivot arm structures pivotally fixed to said carriage about a second common horizontal pivot axis extending parallel to said first common pivot axis and at the same level thereof, third and fourth motor driven circular saws mounted on said respective third and fourth pivot arm structures such that a chord of their respective blades is coincident with said second common pivot axis, a linear tape extending longitudinally of said main frame for indicating the distance between said common pivot axes, a material conveyer traversing said main frame between said saw pairs and at a predetermined level relative to said common pivot axes, means for moving all but said third saw through a predetermined range of angular positions and for retaining each said saw in any selected position within its angular range, means for retaining said third saw in any selected one of a plurality of predetermined positions, and crank and screw means for moving the second and third saw blades away from the respective common pivot axes.

16. The invention in accordance with claim 2, wherein the angular ranges of the first, second, third, and fourth saws reading counterclockwise are approximately 10 to 135 degrees, 288 to 0 degrees, 180 to 270 degrees, and 90 to 162 degrees, respectively.

17. The invention in accordance with claim 8 wherein the angular ranges of the first, second and fourth saws reading counterclockwise is approximately 10 to 135 degrees, 288 to 0 degrees, and 90 to 162 degrees, respectively, and the said fixed angle is 90 degrees.

18. The invention in accordance with claim 2, with means for varying said predetermined level of said material conveyor.

19. The invention in accordance with claim 3, with means for varying said predetermined level of said material conveyor.

20. The invention in accordance with claim 2, wherein the second and third saws and their pivot arm structures are omitted.

21. A building component member cutting machine comprising a main frame, first and second support structures movably secured to said main frame so as to be [adjustable about] *confined to move along a prescribed path defined as a circular arc the center of which is* a first common horizontal axis extending transversely of said main frame, first and second electric motor driven circular saws mounted on said respective support structures such that a chord of each of their respective blades is coincident with said common axis, a carriage mounted on said main frame for traverse longitudinally of said main frame, third and fourth support structures movably secured to said carriage so as to be [adjustable about] *confined to move along a prescribed path defined as a circular arc the center of which is* a second common horizontal axis extending parallel to said first common axis and at the same level thereof, third and fourth motor driven circular saws mounted on said respective third and fourth support structures such that a chord of each of their respective blades is coincident with said second common axis, means for indicating the distance between said common pivot axis, a material conveyor traversing said main frame between said saw pairs and at a predetermined level relative to said common axes, and means for fixing said saws in a plurality of predetermined relative angular positions.

22. A building component member cutting machine comprising a main frame, first and second support structures movably secured to said main frame so as to be [adjustable about] *confined to move along a prescribed path defined as a circular arc the center of which is* a first common horizontal axis extending transversely of said main frame, first and second electric motor driven circular saws mounted on said respective support structure such that a chord of each of their respective blades is coincident with said common axis, a carriage mounted on said main frame for traverse longitudinally of said main frame, third and fourth support structures movably secured to said carriage so as to be [adjustable about] *confined to move along a prescribed path defined as a circular arc the center of which is* a second common horizontal axis extending parallel to said first common axis and at the same level thereof, third and fourth motor driven circular saws mounted on said respective third and fourth support structures such that a chord of each of their respective blades is coincident with said second common pivot axis, means for supporting workpieces for passing same between said saw pairs and at a predetermined level relative to said common axes, and means for fixing said saws in a selected relative angular position.

23. The invention in accordance with claim 22, wherein the second and third saws and their support structures are omitted.

24. A building component member cutting machine comprising a main frame, first and second support structures movably secured to said main frame so as to be [adjustable about] *confined to move along a prescribed path defined as a circular arc the center of which is* a first common horizontal axis extending transversely of said main frame, first and second electric motor driven circular saws mounted on said respective support structures such that a chord of each of their respective blades is coincident with said common axis, a carriage mounted on said main frame for traverse longitudinally of said main frame, third and fourth support structures movably secured to said carriage so as to be [adjustable about] *confined to move along a prescribed path defined as a circular arc the center of which is* a second common horizontal axis extending parallel to said first common axis and at the same level thereof, third and fourth motor driven circular saws mounted on said respective third and fourth support structures such that a chord of each of their respective blades is coincident with said second common pivot axis, means for supporting workpieces for passing same between said saw pairs and at a predetermined level relative to said common axes, and means for moving all but said third saw through a predetermined range of angular positions and for retaining each said saw in any selected position within its angular range, and means for retaining said third saw in any selected one of a plurality of predetermined positions, one of which is a fixed position relative to said fourth saw so that said third saw can traverse the angular range of said fourth saw but at a fixed angle relative to said fourth saw.

25. A building component member cutting machine comprising a main frame, first and second support structures movably secured to said main frame so as to be [adjustable about] *confined to move along a prescribed path defined as a circular arc the center of which is* a first common horizontal axis extending transversely of said main frame, first and second electric motor driven circular saws mounted on said respective support structure such that a chord of each of their respective blades is coincident with said common axis, a carriage mounted on said main frame for traverse longitudinally of said main frame, third and fourth support structures movably secured to said carriage so as to be [adjustable about] *confined to move along a prescribed path defined as a circular arc the center of which is* a second common horizontal axis extending parallel to said first common axis and at the same level thereof, third and fourth motor driven circular saws mounted on said respective third and fourth support structures such that a chord of each of their respective blades is coincident with said second common pivot axis, means for supporting workpieces for passing same between said saw pairs and at a predetermined level relative to said common axes, means for moving each said saw through a predetermined range of angular positions and retaining each said saw in any selected position within its angular range, and means for moving and retaining either or both of said second and third saws in an out of play position.

26. A building component member cutting machine comprising a main frame, first and second support structures movably secured to said main frame so as to be [adjustable about] *confined to move along a prescribed path defined as a circular arc the center of which is* a first common horizontal axis extending transversely of said main frame, first and second electric motor driven circular saws mounted on said respective support structure such that a chord of each of their respective blades is coincident with said common axis, a carriage mounted on said main frame for traverse longitudinally of said main frame, third and fourth support structures movably secured to said carriage so as to be [adjustable about] *confined to move along a prescribed path defined as a circular arc the center of which is* a second common horizontal axis extending parallel to said first common axis and at the same level thereof, third and fourth motor driven circular saws mounted on said respective third and fourth support structures such that a chord of each of their respective blades is coincident with said second common pivot axis, means for supporting workpieces for passing same between said saw pairs and at a predetermined level relative to said common axes, means for moving all but one of said saws through a predetermined range of angular positions and for retaining each said saw in any selected position within its angular range, and means for retaining the other said saw in any selected one of a plurality of predetermined positions one of which is an out of play position.

References Cited by the Examiner

The following references, cited by the Examiner, are of record in the patented file of this patent or the original patent.

UNITED STATES PATENTS

| | | |
|---|---|---|
| 1,740,555 | 12/29 | Warmoth. |
| 1,765,987 | 6/30 | Marion. |
| 1,807,216 | 5/31 | Johnson. |
| 2,228,055 | 1/41 | Howard et al. |
| 2,377,139 | 5/45 | Fraser. |
| 2,422,843 | 6/47 | Mooradian. |

WILLIAM W. DYER, JR., *Primary Examiner.*